(12) United States Patent
Kumar et al.

(10) Patent No.: US 10,444,082 B2
(45) Date of Patent: Oct. 15, 2019

(54) SYSTEM AND METHOD FOR TEMPERATURE MEASUREMENT USING A DUAL-ARRAY MULTI-SPOT-TEMPERATURE SENSOR AND TRANSMITTER ASSEMBLY

(71) Applicant: Honeywell International Inc., Morris Plains, NJ (US)

(72) Inventors: Deepak Kumar, Uttarakhand (IN); Surya Raichor, Telangana (IN); Anubhab Patra, Telangana (IN); Prakash Bist, Andra Pardesh (IN); Shiv Rai, Delhi (IN)

(73) Assignee: Honeywell International Inc., Morris Plains, NJ (US)

( * ) Notice: Subject to any disclaimer, the term of this patent is extended or adjusted under 35 U.S.C. 154(b) by 194 days.

(21) Appl. No.: 15/690,651

(22) Filed: Aug. 30, 2017

(65) Prior Publication Data
US 2019/0064002 A1    Feb. 28, 2019

(51) Int. Cl.
*G01K 7/00* (2006.01)
*G01K 1/00* (2006.01)
(Continued)

(52) U.S. Cl.
CPC .............. *G01K 3/06* (2013.01); *G01K 1/026* (2013.01); *G01K 7/02* (2013.01); *G01K 7/22* (2013.01);
(Continued)

(58) Field of Classification Search
USPC ....... 374/208, 112, 137, 148, 135, 116, 179, 374/183
See application file for complete search history.

(56) References Cited

U.S. PATENT DOCUMENTS

| 2,820,839 A | * | 1/1958 | Schunke | ................ G01K 13/02 136/231 |
| 4,229,798 A | | 10/1980 | Rosie et al. | |

(Continued)

OTHER PUBLICATIONS

Rosemount™ Multipoint Thermocouple and RTD Profiling Sensors, Product Data Sheet, Jul. 2016, Emerson Process Management, 32 pages.

(Continued)

*Primary Examiner* — Mirellys Jagan
(74) *Attorney, Agent, or Firm* — Loza & Loza LLP; Kermit D. Lopez; Luis M. Ortiz

(57) ABSTRACT

Systems and methods for temperature measurement. In an example embodiment, two or more arrays of multi-spot temperature elements can be implemented, wherein at least one array among the two or more arrays constitutes a primary temperature measurement array and at least one other array among the two or more arrays constitutes a redundant temperature measurement array. The redundant temperature measurement array includes redundant spot temperature elements equivalent to spot temperature elements associated with the primary temperature measurement array. A transmitter assembly can also be provided, which communicates electronically with the aforementioned two or more arrays, and which processes and controls such arrays of the multi-spot temperature elements. The secondary (redundant) elements can be configured from the same material as that of the primary spot element(s) or can be composed of a different material depending on the sensor type (e.g., thermcouple, thermistor, etc.).

20 Claims, 9 Drawing Sheets

(51) Int. Cl.
*G01K 3/06* (2006.01)
*G01K 7/22* (2006.01)
*G01K 7/02* (2006.01)
*G01K 15/00* (2006.01)
*G01K 1/02* (2006.01)

(52) U.S. Cl.
CPC ......... *G01K 15/005* (2013.01); *G01K 15/007* (2013.01)

(56) References Cited

U.S. PATENT DOCUMENTS

| | | | | |
|---|---|---|---|---|
| 4,412,090 | A * | 10/1983 | Kawate | G01K 1/08 136/230 |
| 4,915,507 | A | 4/1990 | Janotta | |
| 4,956,996 | A | 9/1990 | Morris | |
| 5,226,729 | A * | 7/1993 | Alford | G01K 13/02 236/78 B |
| 5,765,433 | A | 6/1998 | Johnson | |
| 5,812,588 | A * | 9/1998 | Deak | G01K 1/12 136/230 |
| 5,947,372 | A | 9/1999 | Tiernan | |
| 6,494,616 | B1 * | 12/2002 | Tokhtuev | G01D 3/02 340/870.11 |
| 6,599,011 | B2 * | 7/2003 | Daily | G01K 1/026 136/201 |
| 6,837,619 | B2 * | 1/2005 | Cho | G01K 7/02 374/112 |
| 7,004,625 | B2 * | 2/2006 | Egidio | G01K 1/026 374/112 |
| 9,182,360 | B2 | 11/2015 | Tixier et al. | |
| 9,518,856 | B2 | 12/2016 | Cobianu et al. | |
| 9,624,031 | B2 | 4/2017 | Van Bekkum | |
| 2009/0030634 | A1 | 1/2009 | Schumacher | |
| 2012/0281096 | A1 | 11/2012 | Gellaboina et al. | |
| 2016/0068775 | A1 | 3/2016 | Mattingly et al. | |
| 2017/0082476 | A1 | 3/2017 | Holcomb | |
| 2017/0097253 | A1 | 4/2017 | Van Bekkum | |
| 2017/0219442 | A1 | 8/2017 | Musin et al. | |

OTHER PUBLICATIONS

Rosemount 565/566/765 Multiple Spot Temperature and Water Level Sensors for tank gauging systems, Product Data Sheet, Oct. 2014, Emerson Process Management, 24 pages.
Multiple Spot and Single Spot Temperature Sensors for Rosemount Tank Gauging Systems, Technical Description, Apr. 2009, Emerson Process Management, 34 pages.
VITO MTT Combi Probe, Honeywell Enraf, May 2015, 6 pages.
VITO LT, Honeywell Enraf, May 2015, 6 pages.
TankRadar Rex, High Precision Tank Gauging System, Technical Description, Dec. 2009, Emerson Process Management, 72 pages.

* cited by examiner

Low Temperature Version

SYSTEM AND METHOD FOR TEMPERATURE MEASUREMENT USING A DUAL-ARRAY MULTI-SPOT-TEMPERATURE SENSOR AND TRANSMITTER ASSEMBLY

TECHNICAL FIELD

Embodiments are related to the field of temperature measurement. Embodiments also relate to temperature measurement devices, systems, and methods for liquid storage tanks. Embodiments additionally relate to sensor hardware and software and the transmission of temperature measurement and other data. Embodiments further relate to MST (Multi-Spot Temperature) sensors and automatic liquid storage tank gauging devices, methods, and systems.

BACKGROUND

Existing and conventional temperature measurement methods and systems utilized in the context of liquid storage tanks possess a high risk of process-downtime in replacement in case of any failure. A failure or error in any single/multiple temperature measurement spot-element can lead to losses in custody inventory. Any malfunctioning/erroneous spot element(s), for example, may lead to faulty calculations and resulting errors in, for example, accuracy deviation. These errors are serious and can lead to temperature measurement accuracy being compromised. Currently, adequate provisions are not available for repairing/replacing an individual temperature spot element. A customer, for example, is bound to pay the cost of a complete multi-spot temperature probe, in the event of any single element failure. In the instance of even a single spot element failure, a user may be forced to tamper the measured values in, for example, a tank farm management system to exclude this failed element(s) to derive accurate temperature data.

FIG. 1A and FIG. 1B illustrate examples of respective conventional temperature measurement probes 10 and 11 that possess a high risk of process-downtime during replacement due to any failure. The probe 10 shown in FIG. 1A includes, for example, at least one flying lead 12 having a particular length L and a lock nut and washer arrangement 14 located above a maximum flange position 16. A label VITO (Versatile In Tank Observer) probe 18 is located below the maximum flange position 16. A flange 20 (which can be optional) is located below the label VITO probe 18. An intermediate component 21 is located below the optional flange 20 and above a location 22, which represents the "position highest element," which in turn is located above a lower component 24. Note that in both FIGS. 1A and 1B, identical or similar parts or elements are indicated by identical reference numerals. Despite these similarities, there are some differences between the probes 10 and 11 respectively shown in FIGS. 1A and 1B. For example, a different location 23 ("position highest element") is shown in FIG. 1B rather than the location 22 shown in FIG. 1A. Additionally, the probe 11 shown in FIG. 1B is a low temperature version probe.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved temperature measurement systems, devices, and methods.

It is another aspect of the disclosed embodiments to provide for improved temperature measurement systems, devices, and methods applicable to liquid storage tanks.

It is still another aspect of the disclosed embodiments to provide for sensor hardware and software and the transmission of temperature measurement and other data.

It is yet another aspect of the disclosed embodiments to provide for the use of MST (Multi-Spot Temperature) sensors and temperature measurement using a dual-array MST sensor and transmitter assembly.

The aforementioned aspects and other objectives and advantages can now be achieved as described herein. Systems and methods are disclosed for temperature measurement. In an example embodiment, two or more arrays of multi-spot temperature elements can be implemented, wherein at least one array among the two or more arrays constitutes a primary temperature measurement array and at least one other array among the two or more arrays constitutes a redundant temperature measurement array. The redundant temperature measurement array includes redundant spot temperature elements equivalent to spot temperature elements associated with the primary temperature measurement array. A transmitter assembly can also be provided, which communicates electronically with the aforementioned two or more arrays, and which processes and controls such arrays of the multi-slot temperature elements.

In one example embodiment, the redundant temperature measurement array can be placed in an inline location with respect to the multi-spot temperature elements of the primary temperature measurement array. In an alternative example embodiment, the redundant temperature measurement array can be placed a location above the multi-spot temperature elements of the primary temperature measurement array. In yet another example embodiment, the redundant temperature measurement array can be placed a location below the multi-spot temperature elements of the primary temperature measurement array. Using any one of the aforementioned embodiments, redundant temperature measurement can be performed with a single probe.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figures 1A, 1B:
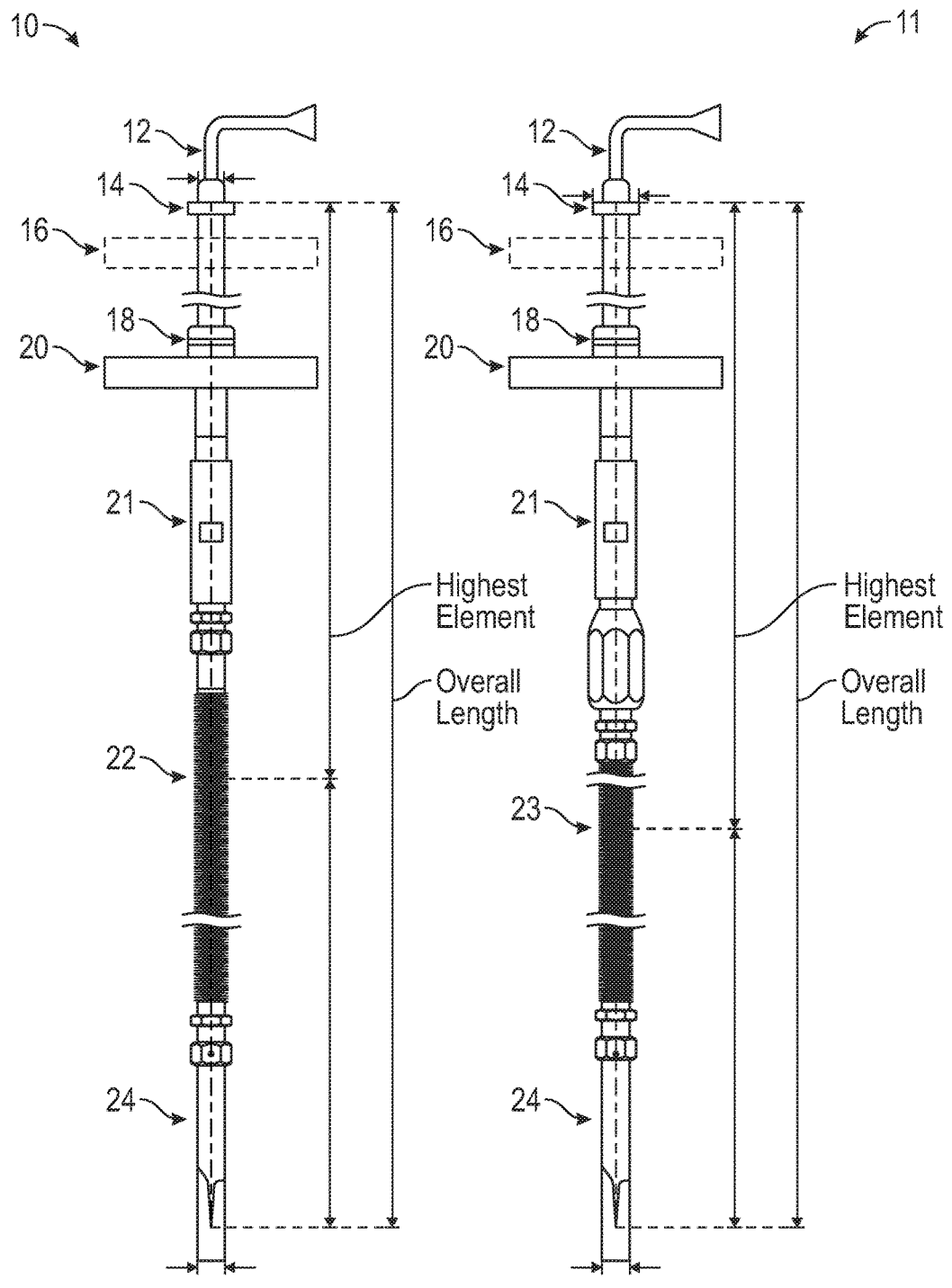
FIG. 1A and FIG. 1B illustrate respective examples of conventional temperature measurement probes that possess a high risk of process-downtime during replacement due to any failure.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be interpreted as limited to the embodiments set forth herein; rather, these embodiments are provided so that this disclosure will be thorough and complete, and will fully convey the scope of the embodiments to those skilled in the art. As used herein, the term "and/or" includes any and all combinations of one or more of the associated listed items.

Reference will be made in detail to the disclosed embodiments (exemplary embodiments) of the invention, examples of which are illustrated in the accompanying drawings, and which may be preferred or alternative embodiments. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected.

As will be discussed in more detail herein, the disclosed embodiments utilize an array of equivalent redundant spot temperature elements that can be placed in line, above, or below MST probe spot-elements, the conventional MST probe spot-elements. With this redundancy and variations in the positioning of spot elements, a redundant temperature measurement can be accomplished with a single probe. An intelligent transmitter assembly is also provided, which is capable of processing and controlling the two arrays of multi-spot temperature elements (primary and redundant). Such a solution provides for both the automatic and manual selection of a probe for deploying redundancy based on boundaries/ranges defined for drift and failures. In addition, such a solution allows for advanced data analytics with readily available information and processed data for diagnostics, along with an "intelligent" algorithm that checks the drift or deviation of individual temperature elements.

Figure 2:
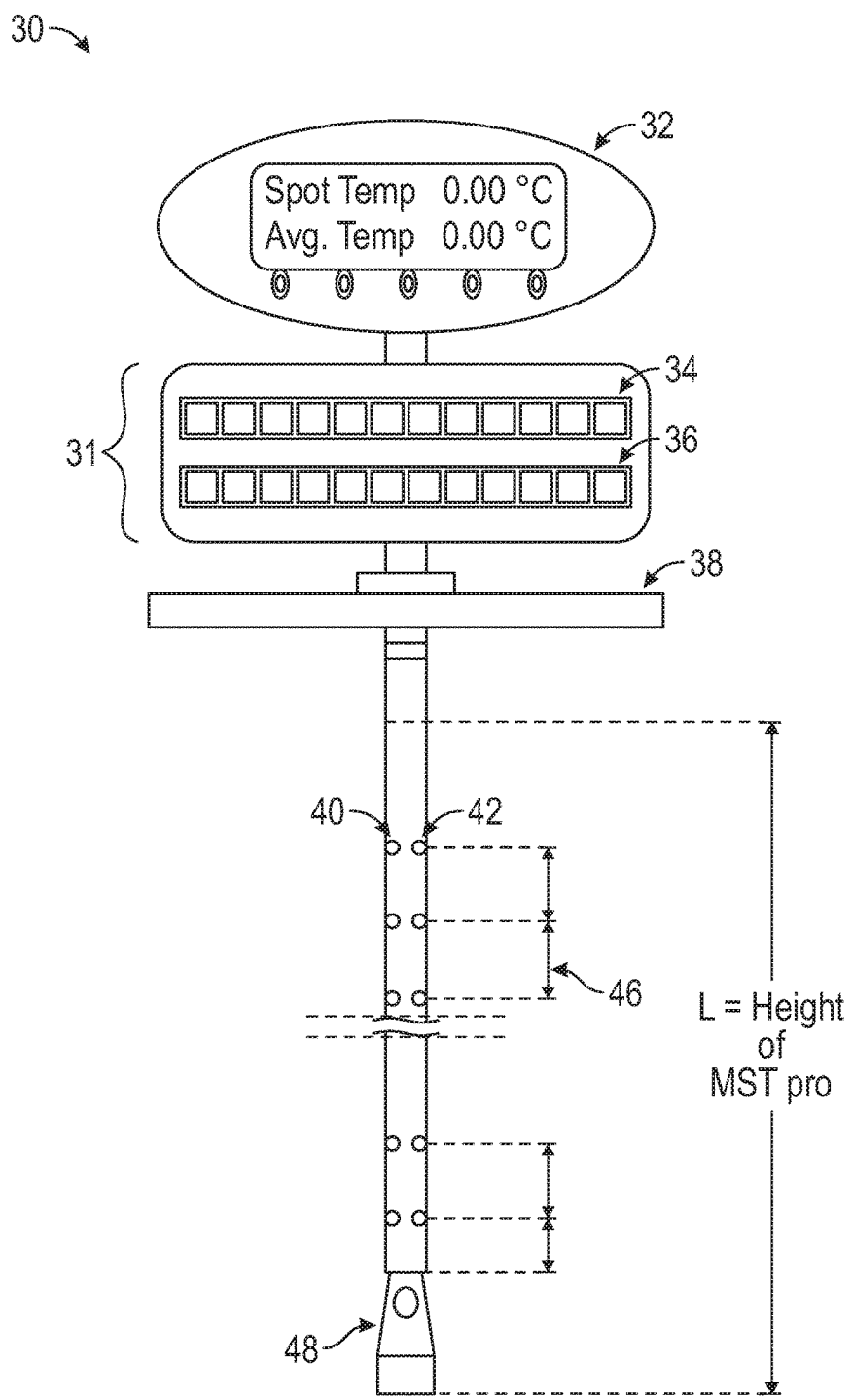
FIG. 2 illustrates a schematic diagram of a temperature measurement system including an intelligent transmitter and sensor probe with a redundant spot elements array, in accordance with an example embodiment.

FIG. 2 illustrates a schematic diagram of a temperature measurement system 30 that includes an "intelligent" transmitter 32 and a sensor probe composed of a terminal block 31 that maintains at least one primary element 34 and at least one redundant element 36, in accordance with an example embodiment. The terminal block 31 is located above a flange 38, which in turn is located above an MST probe. A primary spot element 40 and a redundant spot element 42 are located on the MST probe and below the flange 38. An inter-element spacing 46 is shown in FIG. 2 as per standards. An anchor weight arrangement 48 is also depicted in FIG. 2 at the bottom of the MST probe.

The solution provided by the temperature measurement system 30 shown in FIG. 2 is generally composed of two parts. The first part is the MST probe having an array of redundant multiple spot elements. The second part is the "smart" transmitter 32, which can be configured to select and process temperature data-based on a user configuration for the spot elements (i.e., via primary or secondary elements).

Figure 3:
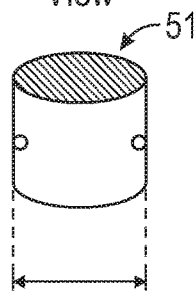
FIG. 3 illustrates a schematic diagram of a sensor probe with redundant spot elements placed inline, in accordance with an example embodiment.
Figure 3:
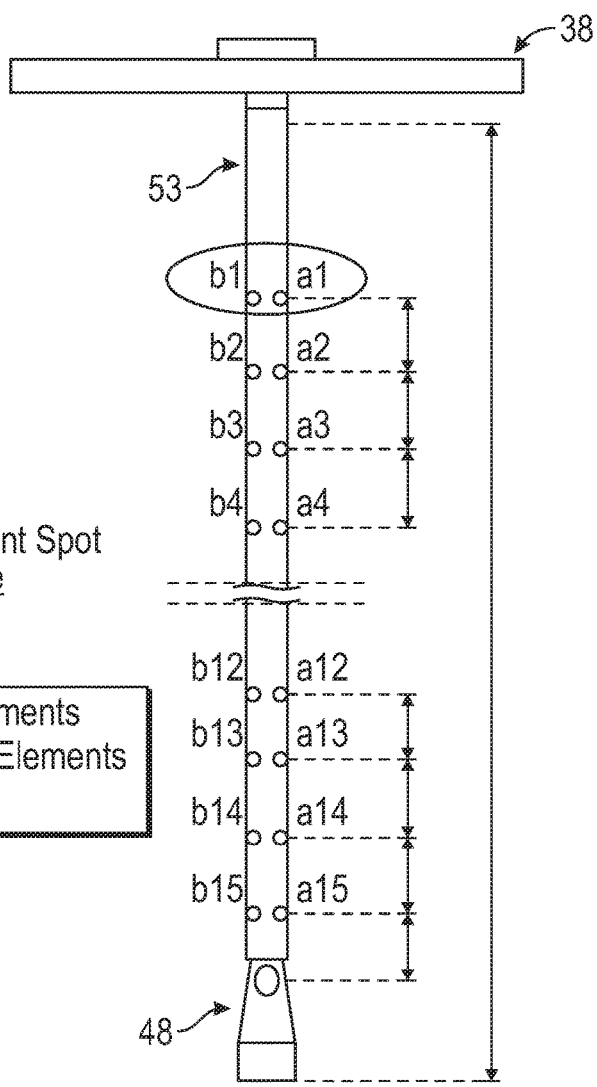

FIG. 3 illustrates a schematic diagram of a sensor probe 50 with redundant spot elements placed inline, in accordance with an example embodiment. The sensor probe 50 shown in FIG. 3 can be implemented as an MST probe. The secondary (redundant) elements can be configured from the same material as that of the primary spot element(s) or can be composed of a different material depending on the sensor type (e.g., thermocouple, thermistor, etc.). In the configuration shown in FIG. 3, the sensor probe 50 includes a flange 38 located above a probe body 53.

The legend 61 shown in FIG. 3 refers to primary spot elements (e.g., a1 . . . a15) and redundant spot elements (e.g., b1 . . . b15) in a configuration in which the redundant element is placed adjacent to the primary element on the same horizontal axis. Note that in the example shown in FIG. 3, the numbers a1 . . . a15 and b1 . . . b15 are only examples. That is, 15 spots are considered only as examples and should not be interpreted as limiting the number of spots. The distance of the spot elements is, for example, 1.5 or 3 meters and may vary as per standards followed. In FIG. 3, the redundant element(s) is placed adjacent to the primary element on the same horizontal aids. The cross sectional view 51 of the probe body 53 is also shown in FIG. 3. In the FIG. 3 example embodiment, the array (or arrangements) of spot element(s) can be positioned using, for example, the aforementioned inline arrangement.

Figure 4:
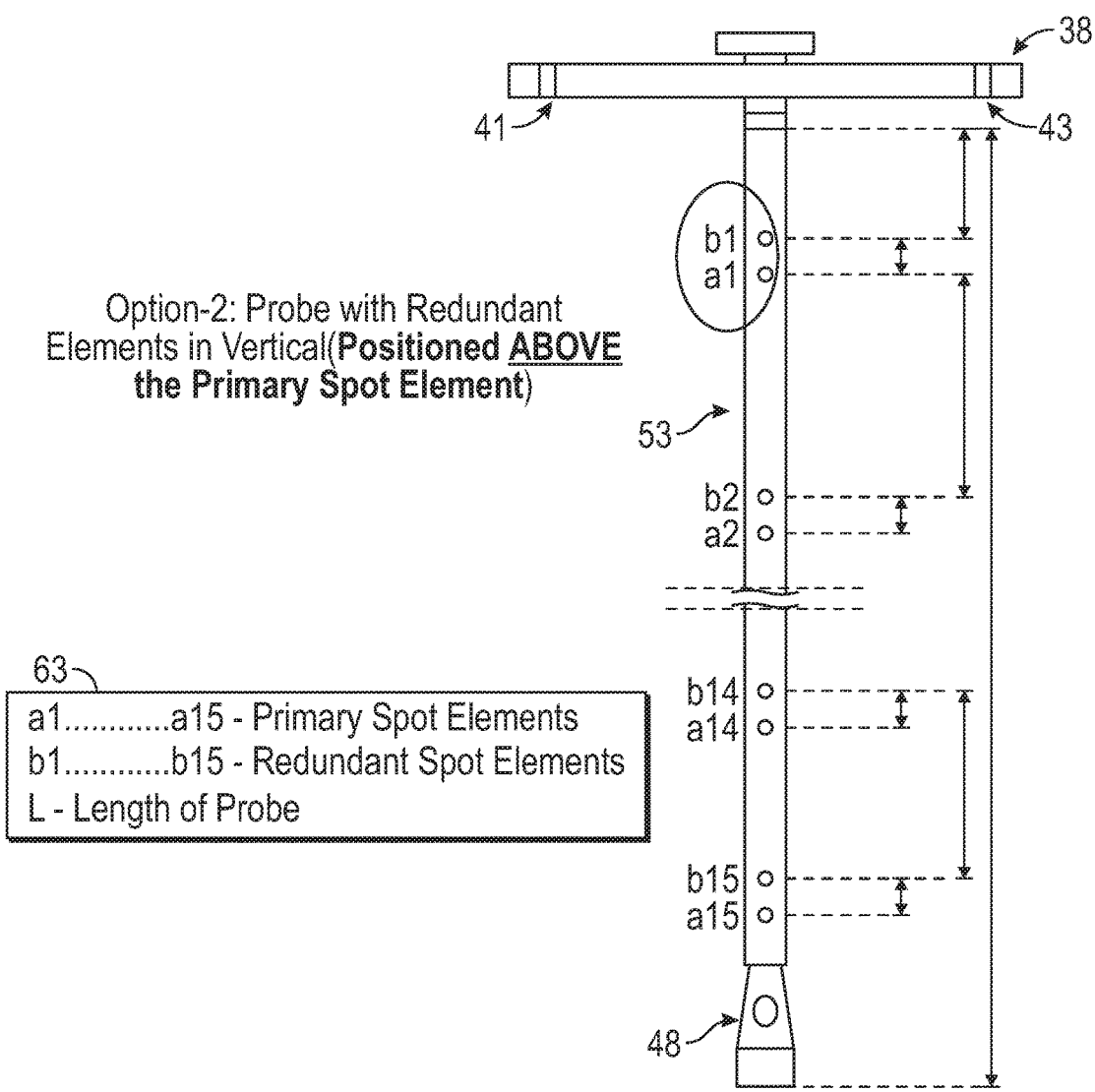
FIG. 4 illustrates a schematic diagram of a sensor probe with redundant spot elements placed in a vertical position above the primary spot element, in accordance with an alternative example embodiment.

FIG. 4 illustrates a schematic diagram of the sensor probe 52 with redundant spot elements placed in a vertical position above the primary spot element, in accordance with an alterative example embodiment. Note that in the different embodiments shown in FIGS. 2-6, identical or similar elements are indicated by identical reference numerals. The configuration shown in FIG. 4 differs from that shown in FIG. 3 in that the array (or arrangements) of spot element(s) is positioned based on placement of the redundant element above the primary spot element. The legend 63 shown in FIG. 4 indicates primary spot elements and redundant spot elements with respect to the probe body 53 shown in FIG. 4. In addition, the flange 38 depicted in FIG. 4 can be configured with one or more holes 41 and 43, through which screws or other components may be received for additional mounting purposes. The holes 41 and 43 are optional and may or may not appear in some example embodiments.

Figure 5:
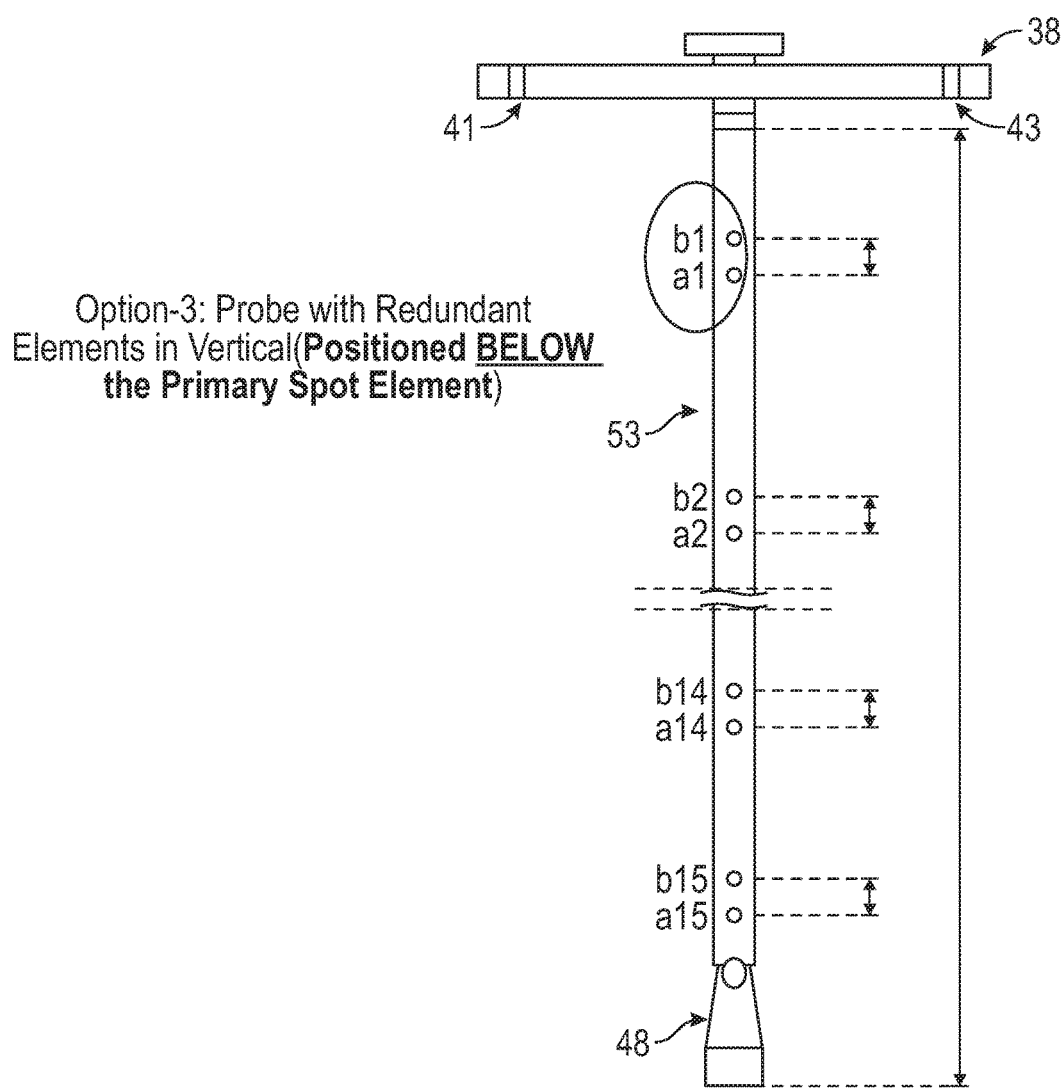
FIG. 5 illustrates a schematic diagram of a sensor probe with redundant spot elements placed in a vertical position below the primary spot element, in accordance with an alternative example embodiment.

FIG. 5 illustrates a schematic diagram of a sensor probe 56 with redundant spot elements placed in a vertical position below the primary spot element, in accordance with an alternative example embodiment. In the configuration shown in FIG. 5, the array (or arrangements) of spot element(s) can be positioned based on a redundant element placed below the spot element.

Figure 6:
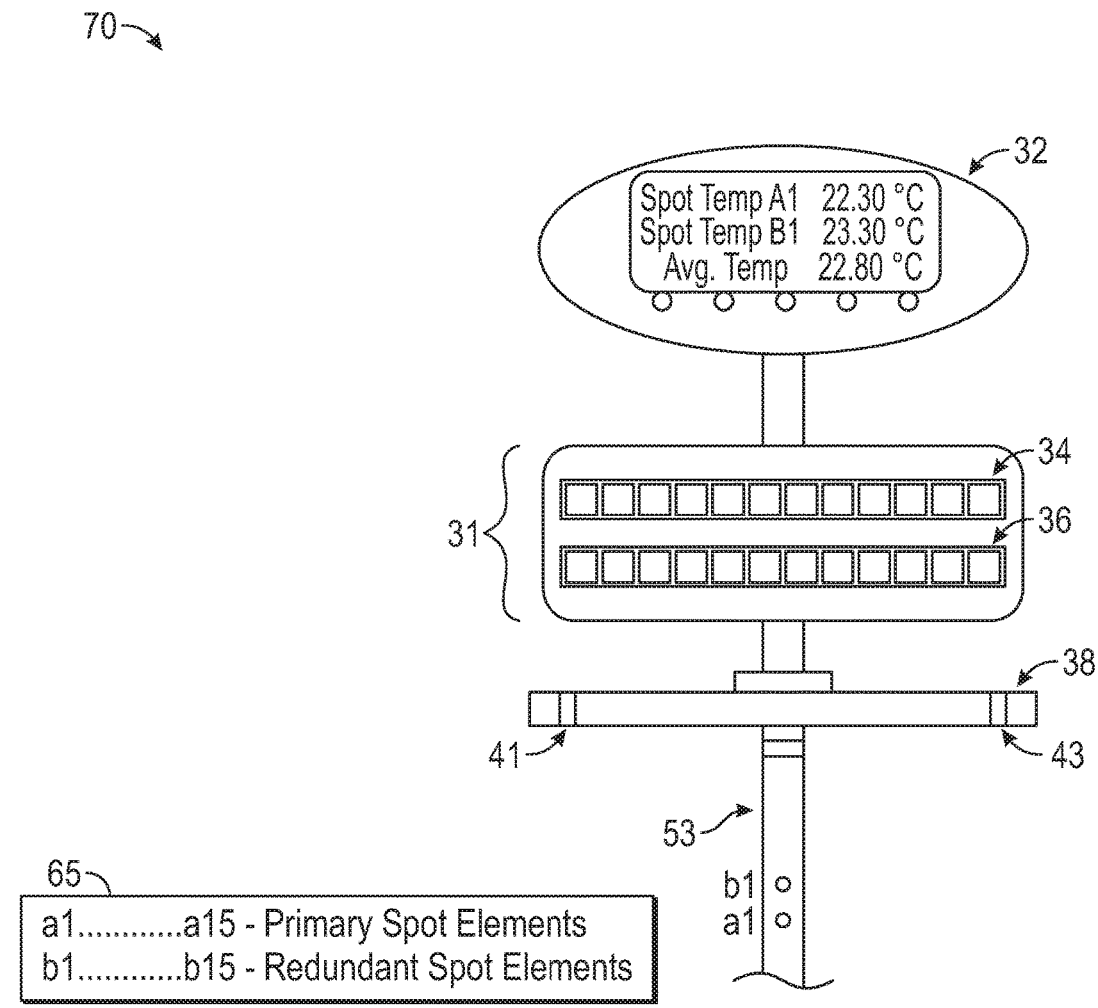
FIG. 6 illustrates a schematic diagram of a smart transmitter assembly, which can be implemented in accordance with an example embodiment.

FIG. 6 illustrates a schematic diagram of a smart transmitter assembly 70, which can be implemented in accordance with an example embodiment. The transmitter assembly 70 includes a transmitter, which can be utilized to isolate a faulty probe, or faulty spot element and restore the process with no downtime during the failure of a spot element(s). The MST redundant probe can enable user efficiencies by, for example, hot redundancy, cold redundancy, period health status, and "intelligence" selection.

Hot redundancy is for a critical measurement process, and involves continuously a standby system/element, which can assist a fail-safe system in overtaking the identical primary system. Cold redundancy is for a non-critical measurement process, and involves an alternative where time is not a high priority and human intervention is acceptable. An "intelligence" can be utilized to select between the different redundancy combinations in case of element (spots) failure. Redundancy options are available for both automatic and manual modes, involving, for example, a complete switchover from primary to redundant, and a mixed combination (only failed spots) of primary and redundant spot element for a best available match.

The disclosed embodiments thus involve the use of an MST probe with two array(s) of primary and secondary spot elements. The sensor used for the primary and secondary elements can be configured from the same or different material type. Such a combination of sensor types can offer robustness and increased life to the system. The spots elements are positioned to ensure precise measurement of the average tank temperature. Positioning of temperature measuring elements on MST can be based on a variety of different combinations such as, for example, the redundant/secondary element position shall be in line with respect to PRIMARY element (FIG. 2), and different positions of redundant RTD element inside the MST probe (inline, above and below, as discussed previously herein).

Figure 7A:
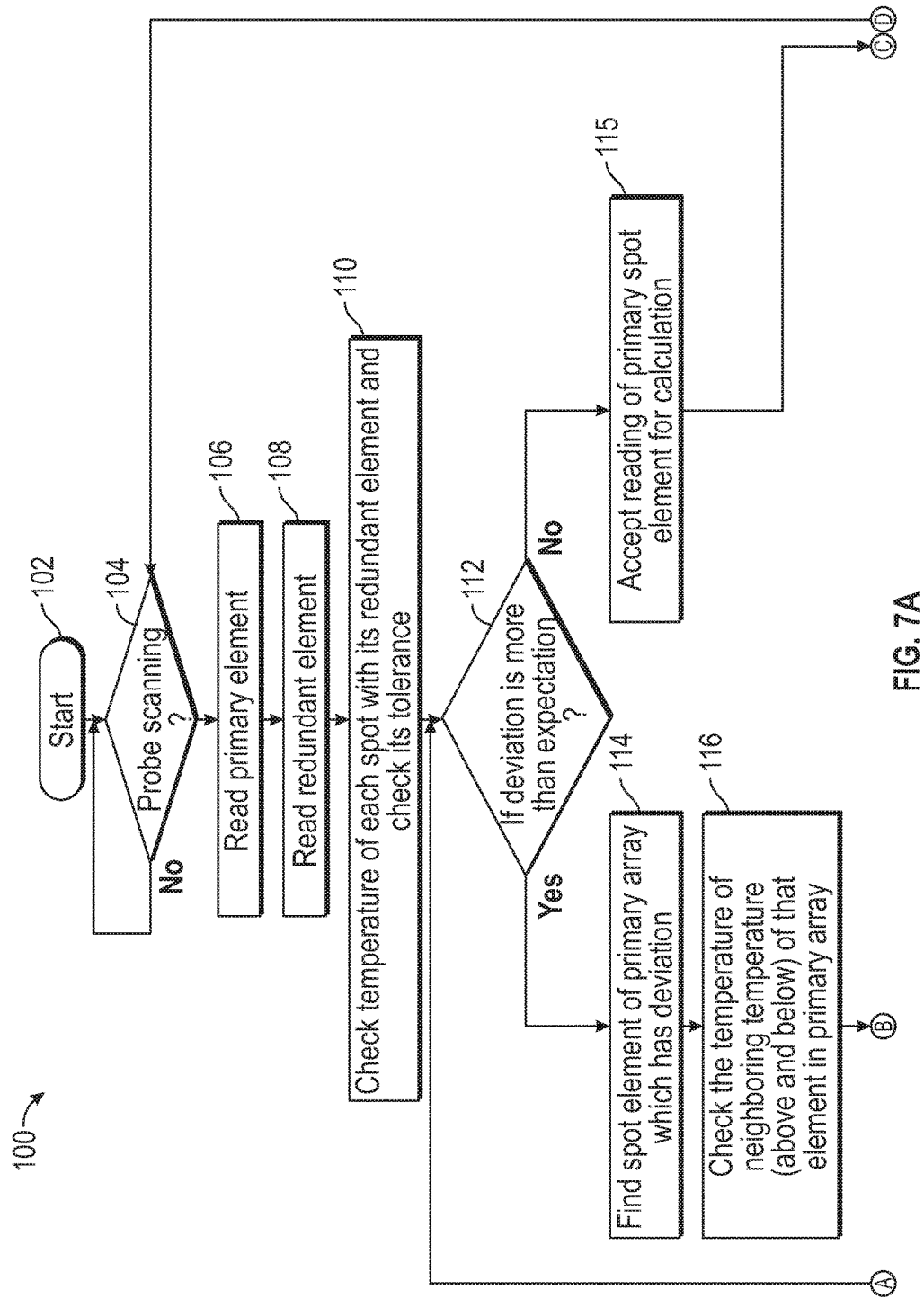
FIGS. 7A-7B illustrate a high-level flow chart of operations depicting logical operational steps of a method for measuring temperature using a dual-array MST temperature sensor and transmitter assembly, in accordance with an example embodiment.
Figure 7B:
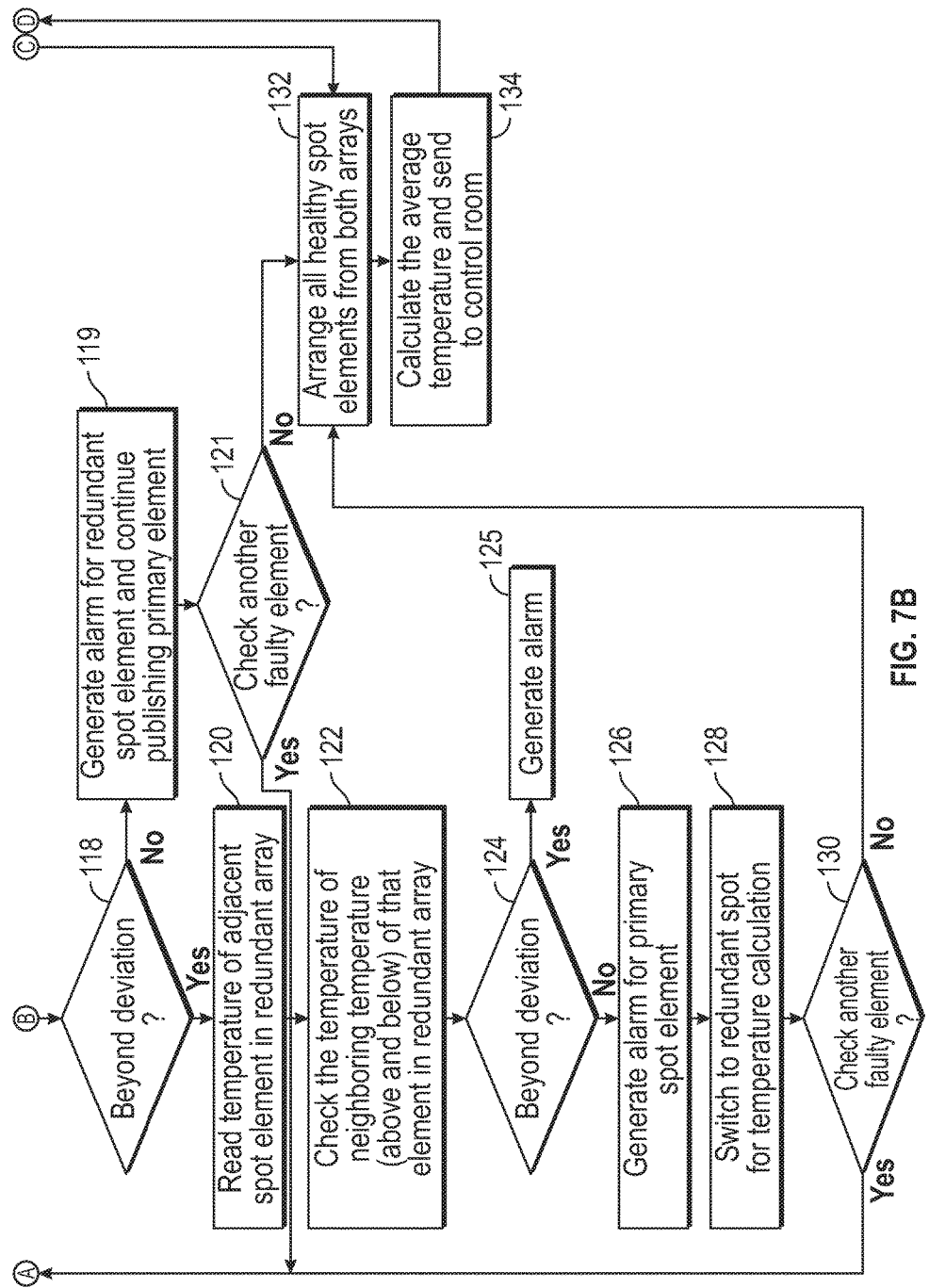

FIGS. 7A-7B illustrate a high-level flow chart of operations depicting logical operational steps of a method 100 for measuring temperature using a dual-array MST temperature sensor and transmitter assembly, in accordance with an example embodiment. Note that FIGS. 7A-7B depict a single continuous flow chart of method 100 broken into the two figures, for simplification. As shown at block 102 in FIG. 7A, the process begins. Thereafter, as indicated at decision block 104, a test can be performed to determine if the probe (e.g., the probes discussed herein) is scanning (e.g., measuring for temperature). If the answer is "no," then the process begins again, as shown at block 102. If, however, the answer is "yes," then as indicated at block 106, a primary element(s) can be read and then as shown at block 108, a redundant element(s) is also read.

Next as depicted at block 110, an operation can be implemented to check the temperature of each spot with its redundant element and check its tolerance. Thereafter, as shown at decision block 112, a test can be performed to determine if a resulting deviation is more than expected. If the answer is "yes," then as shown at block 114, an operation can be processed to find a spot element of the primary array, which has the deviation. Thereafter, as shown at block 116, an operation can be implemented to check the temperature of a neighboring temperature (e.g., above and below) of that element in the primary array. If the answer is "no," then an operation can be implemented, as shown at block 115 to accept the reading of the primary spot element for calculation followed by processing of the operation shown at block 132 and 134 and so on.

Next, as shown at decision block 118 of FIG. 7B, a test or operation can be implemented to determine if the results are beyond the deviation. If not, then as shown at block 119, an operation can be implemented to generate an alarm for the redundant spot element and to continue publishing the primary element, followed by an operation (see decision block 121) to check for another faulty element. Assuming the answer to the operation shown at decision block 118 is "yes," then an operation can be implemented to read the temperature of the adjacent spot element in the redundant array, as indicated at block 120 followed by an operation to check the temperature of the neighboring temperature (e.g., above and below) of that element in the redundant array, as shown at block 122.

Thereafter, as illustrated at block 124, a test or operation can be implemented to determine if the results are beyond the deviation. If so, an alarm is generated as shown at block 125. If not, then an alarm is generated to the primary spot element, as depicted at block 126, followed by an operation to switch to the redundant spot for temperature calculation, as depicted at block 128. Thereafter, as indicated at decision block 130, a test can be performed to check for another faulty element. If a "no" answer results, then as shown at block 132, an operation can be implemented to arrange all healthy spot elements from both arrays, followed by an operation to calculate the average temperature and send this temperature result to the control room of, for example, an industrial plant of facility.

As can be appreciated by one skilled in the art, embodiments can be implemented in the context of a method, data processing system, or computer program product. Accordingly, embodiments may take the form of an entire hardware embodiment, an entire software embodiment, or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object-oriented programming language (e.g., Java, C++, etc.). The computer program code, however, for carrying out operations of particular embodiments may also be written in conventional procedural programming languages, such as the "C" programming language or in a visually oriented programming environment, such as, for example, Visual Basic.

The program code may execute entirely on a user's, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., Wi-Fi, Wimax, 802.xx, and cellular network, or the connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks. To be clear, the disclosed embodiments can be implemented in the context of, for example, a special-purpose computer or a general-purpose computer, or other programmable data processing apparatus or system. For example, in some embodiments, a data processing apparatus or system can be implemented as a combination of a special-purpose computer and a general-purpose computer.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
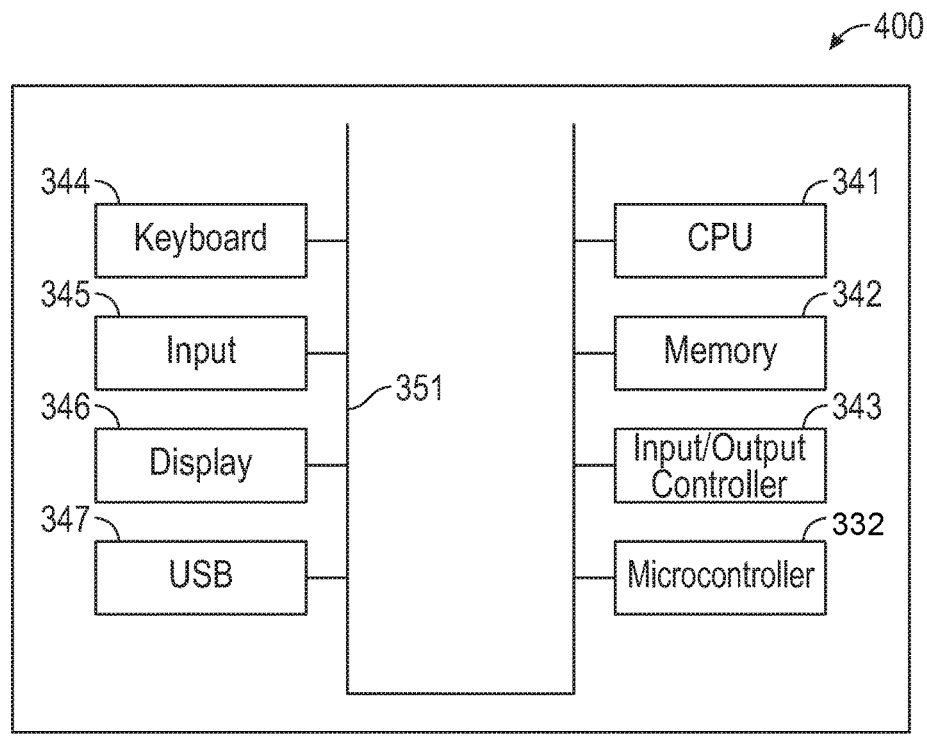
FIG. 8 illustrates a schematic view of a computer system/apparatus, which can be implemented in accordance with an example embodiment.
Figure 9:
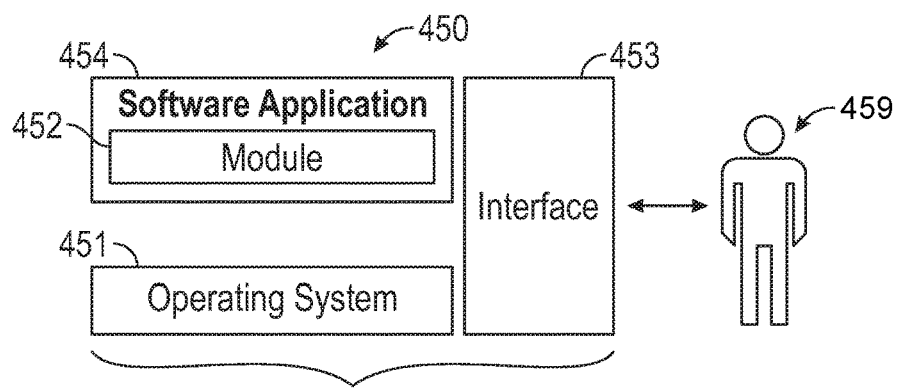
FIG. 9 illustrates a schematic view of a software system including a module, an operating system, and a user interface, which can also be implemented in accordance with an example embodiment.

FIGS. 8-9 are shown only as exemplary diagrams of data-processing environments in which example embodiments may be implemented. It should be appreciated that FIGS. 8-9 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 8, some example embodiments may be implemented in the context of a data-processing system/apparatus 400 that can include, for example, one or more processors such as a processor 341 (e.g., a CPU (Central Processing Unit) and/or other microprocessors), a memory 342, an input/output controller 343, a microcontroller 332, a peripheral USB (Universal Serial Bus) connection 347, a keyboard 344 and/or another input device 345 (e.g., a pointing device, such as a mouse, track ball, pen device, etc.), a display 346 (e.g., a monitor, touch screen display, etc.), and/or other peripheral connections and components.

As illustrated, the various components of data-processing system/apparatus 400 can communicate electronically through a system bus 351 or similar architecture. The system bus 351 may be, for example, a subsystem that transfers data between, for example, computer components within data-processing system/apparatus 400 or to and from other data-processing devices, components, computers, etc. The data-processing system/apparatus 400 may be implemented in some embodiments as, for example, a server in a client-server based network (e.g., the Internet) or in the context of a client and a server (i.e., where aspects are practiced on the client and the server). The data-processing system/apparatus 400 may be implemented in some embodiments as, for example, a server and/or a personal computer, a mobile device (e.g., smartphone, tablet computing device, laptop computer, etc.), and/or other computing devices or systems, etc.

In other example embodiments, data-processing system/apparatus 400 may be, for example, a standalone desktop computer, a laptop computer, a smartphone, a pad computing device and so on, wherein each such device is operably connected to and/or in communication with a client-server based network or other types of networks (e.g., cellular networks, Wi-Fi, etc.).

FIG. 9 illustrates a computer software system/apparatus 450 for directing the operation of the data-processing system/apparatus 400 depicted in FIG. 8. Software application 454 stored, for example, in memory 342, generally includes a kernel or operating system 451 and a shell or interface 453. One or more application programs, such as software application 454, may be "loaded" (i.e., transferred from, for example, mass storage or another memory location into the memory 342) for execution by the data-processing system/apparatus 400. The data-processing system/apparatus 400 can receive user commands and data through the interface 453; these inputs may then be acted upon by the data-processing system/apparatus 400 in accordance with instructions from operating system 451 and/or software application 454. The interface 453 in some embodiments can serve to display results, whereupon a user 459 may supply additional inputs or terminate a session. The software application 454 can include module(s) 452, which can, for example, implement the various instructions or operations such as those discussed herein with respect to FIGS. 1-7 herein. Module 452 may also be composed of a group of modules or sub-modules that implement particular instructions, steps, or operations, such as discussed and illustrated herein with respect to FIG. 7.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" can constitute a software application, but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

FIGS. 8-9 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function. For example, some embodiments may be implemented in the context of a special-purpose computer instead of a general-purpose computer or vice versa.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed, which may reside on a computer-readable medium. Computer-readable media can include computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The disclosed embodiments offer a number of benefits. For example, a hot-redundant MST system is capable of overtaking failures and handling unplanned maintenances. This approach can also ensure fail-safe circumstances in liquid hydrocarbon product O&M (Operations and Maintenance) and secure process uptime. In addition, the disclosed approach will result in no shutdowns or process breakdowns. The disclosed redundant probe can also reduce the downtime for future breakdown/unplanned/scheduled maintenance. Existing and new customers will also find the disclosed dual option in a single installation attractive due to minimal maintenance expenditure and accuracy, accurate process measurement, and the fact that human interference and corresponding errors will be considerably reduced.

The preceding description of the disclosed embodiments is provided to enable any person skilled in the art to make or use such embodiments. Various modifications to these embodiments will be readily apparent to those skilled in the art, and the generic principles defined herein may be applied to other embodiments without departing from the spirit or scope of the invention. Thus, the disclosed embodiments are not intended to be limited to the embodiments shown herein but are to be accorded the widest scope consistent with the following claims and the principles and novel features disclosed herein.

The invention claimed is:

1. A system for temperature measurement, said system comprising:
    at least two arrays of multi-spot temperatures elements, wherein at least one array among said at least two arrays comprises a primary temperature measurement array and a redundant temperature measurement array, said redundant temperature measurement array having redundant spot temperature elements equivalent to spot temperature elements associated with said primary temperature measurement array; and
    a transmitter assembly that communicates electronically with said at least two arrays, wherein said transmitter assembly processes and controls said at least two arrays of said multi-spot temperature elements.

2. The system of claim 1, wherein said redundant temperature measurement array is placed in an inline location with respect to said multi-spot temperature elements of said primary temperature measurement array.

3. The system of claim 1, wherein said redundant temperature measurement array is placed a location above said multi-spot temperature elements of said primary temperature measurement array.

4. The system of claim 1, wherein said redundant temperature measurement array is placed a location below said multi-spot temperature elements of said primary temperature measurement array.

5. The system of claim 1, wherein redundant temperature measurement is performed with a single probe.

6. The system of claim 1, wherein said redundant spot temperature elements are configured from a same material as said spot temperature elements associated with said primary temperature measurement array.

7. The system of claim 1, wherein said redundant spot temperature elements are configured from a material different from a material utilized for said spot temperature elements associated with said primary temperature measurement array.

8. The system of claim 1, wherein said redundant spot temperature elements are configured from a material based on a sensor type.

9. The system of claim 8, wherein said sensor type comprises a thermocouple.

10. The system of claim 8, wherein said sensor type comprises a thermistor.

11. An apparatus for temperature measurement, said system comprising:
    a sensor probe;
    at least two arrays of multi-spot temperatures elements associated with said sensor probe, wherein at least one array among said at least two arrays comprises a primary temperature measurement array and a redundant temperature measurement array, said redundant temperature measurement array having redundant spot temperature elements equivalent to spot temperature elements associated with said primary temperature measurement array; and
    a transmitter assembly that communicates electronically with said at least two arrays, wherein said transmitter assembly processes and controls said at least two arrays of said multi-spot temperature elements.

12. The system of claim 11, wherein said redundant temperature measurement array is placed in an inline location with respect to said multi-spot temperature elements of said primary temperature measurement array, a location above said multi-spot temperature elements of said primary temperature measurement array, or a location below said multi-spot temperature elements of said primary temperature measurement array.

13. A method for temperature measurement, said method comprising:
    providing at least two arrays of multi-spot temperatures elements, wherein at least one array among said at least two arrays comprises a primary temperature measurement array and a redundant temperature measurement array, said redundant temperature measurement array having redundant spot temperature elements equivalent to spot temperature elements associated with said primary temperature measurement array; and
    communicating electronically with said at least two arrays via transmitter assembly, wherein said transmitter assembly processes and controls said at least two arrays of said multi-spot temperature elements.

14. The method of claim 13, wherein said redundant temperature measurement array is placed in an inline location with respect to said multi-spot temperature elements of said primary temperature measurement array.

15. The method of claim 13, wherein said redundant temperature measurement array is placed a location above said multi-spot temperature elements of said primary temperature measurement array.

16. The method of claim 13, wherein said redundant temperature measurement array is placed a location below said multi-spot temperature elements of said primary temperature measurement array.

17. The method of claim 13, wherein redundant temperature measurement is performed with a single probe.

18. The method of claim 13, wherein said redundant spot temperature elements are configured from a same material as said spot temperature elements associated with said primary temperature measurement array.

19. The method of claim 13, wherein said redundant spot temperature elements are configured from a material different from a material utilized for said spot temperature elements associated with said primary temperature measurement array.

20. The method of claim 13, wherein said redundant spot temperature elements are configured from a material based on a sensor type.

* * * * *